Patented Apr. 27, 1954

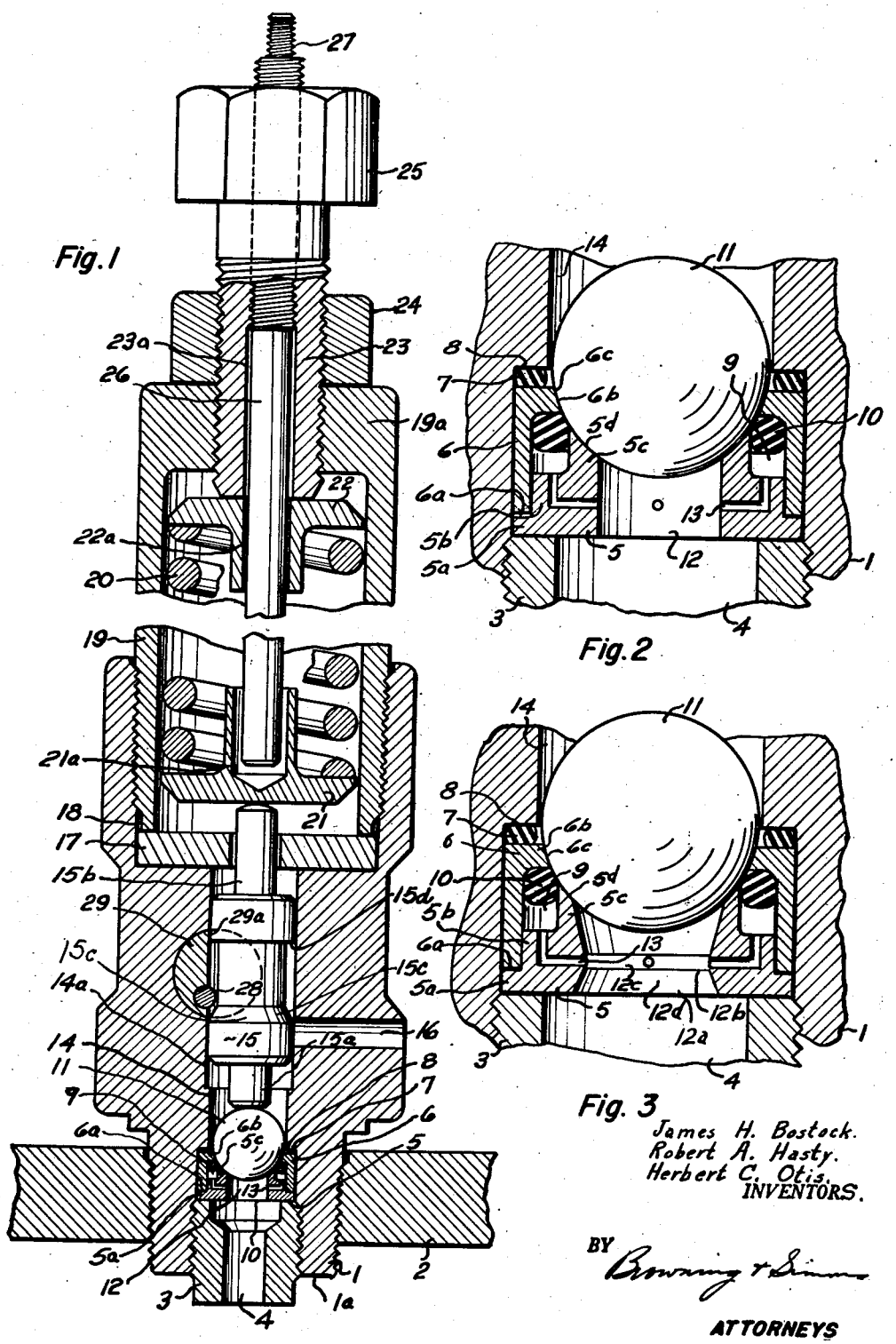

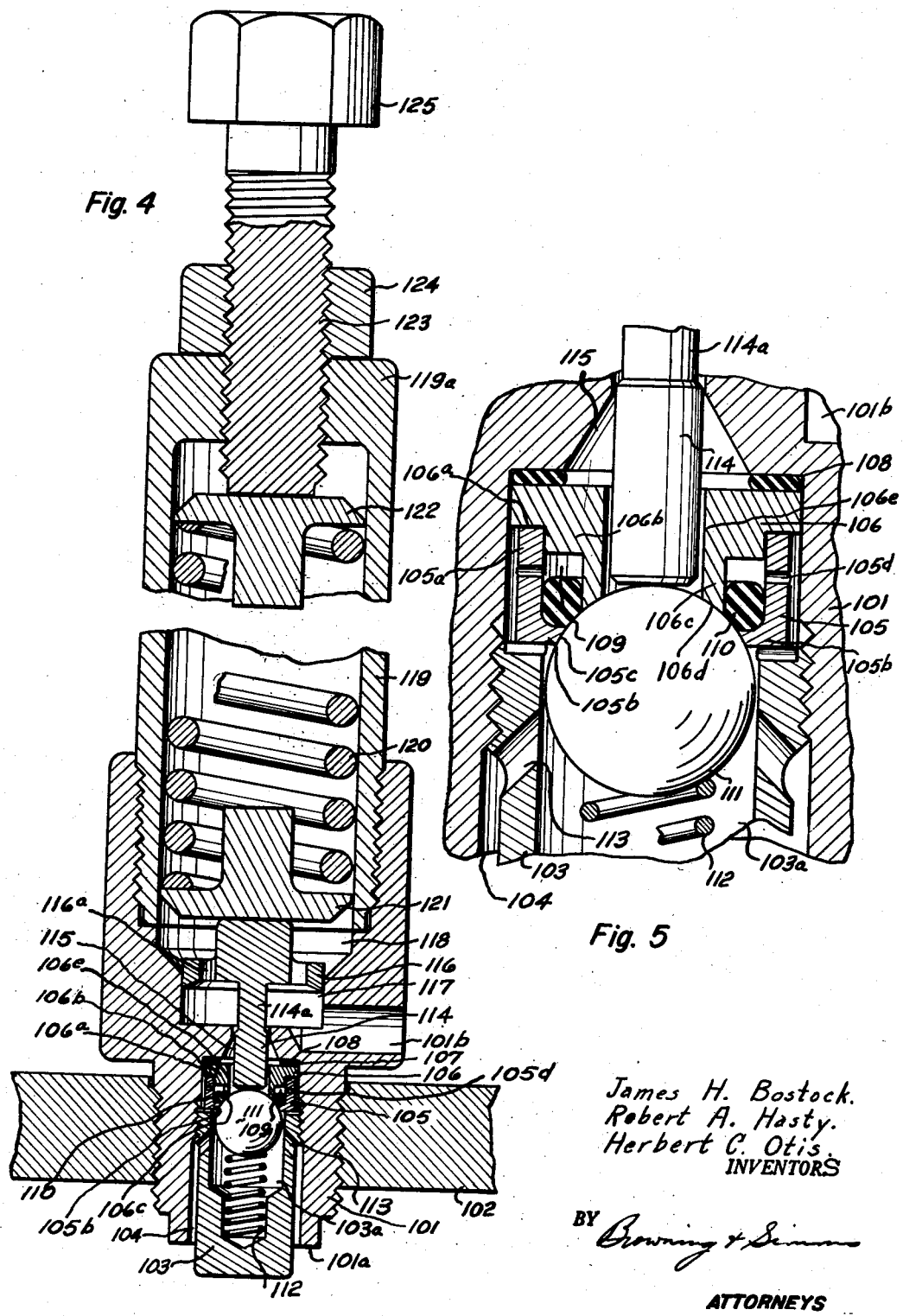

2,676,782

UNITED STATES PATENT OFFICE 2,676,782

VALVE SEAT WITH PRESSURE MOVABLE SEALING MEANS FOR SEALING WITH VALVE MEMBERS

James H. Bostock, Robert A. Hasty, and Herbert C. Otis, Dallas, Tex., assignors to Otis Engineering Corporation, Dallas, Tex., a corporation of Texas Application November 1, 1948, Serial No. 57,766

7 Claims. (Cl. 251—364)

1

The invention hereinafter disclosed relates to improvements in poppet or ball valve seats and has for its general object the provision of a valve having a novel seat and valve member arrangement with a packing element formed of resilient sealing material adapted to provide a seal between the rigid portion of these parts with the valve closed.

In many valves the valve and seat members are small and yet the pressures to be controlled are great as, for example, in pressure relief valves. It is difficult to provide an adequate seal for the closed valve when utilizing only metal-to-metal parts for the seated members and yet they do not lend themselves readily to the usual arrangement of sealing materials for sealing such joints.

An object of this invention is to provide a valve wherein a positive seal is obtained between the valve seat and the valve member.

Another object is to provide a valve wherein the valve seat carries a resilient seal ring intermediate the seating surfaces of the seat providing a continuous surface exposed exteriorly of the seat with means for forcing the seal member against a seated valve member by the controlled pressure.

A further object is to provide a valve seat having a continuous seating surface divided by a continuous opening wherein the seat carries a resilient sealed element having a portion exposed through said opening adapted to be engaged by a valve member when seated and having means communicating with the valve passageway upstream of the seat for conducting the pressure to be controlled to the side of the seal element remote from the valve member.

Still another object is to provide a valve seat having a continuous seating surface divided by a continuous opening wherein the seat carries a resilient sealed element having a portion exposed through said opening adapted to be engaged by a valve member when seated and having passages which communicate between the seal member and the passageway controlled by the valve in such manner that the pressure within the passages and acting against the seal element is reduced when the valve member is unseated.

A still further object is to provide a seal assembly comprising two cooperating seated parts having a seating surface with an opening therein and containing a resilient seal element adapted to be pressed against the opening by the pressure controlled.

Other and further objects of this invention will appear from the description.

2

In the accompanying drawings which form a part of the instant specification, are to be read in conjunction therewith and wherein like reference numerals are used to indicate like parts in the various views:

Fig. 1 is a vertical section of a valve embodying this invention;

Fig. 2 is a view upon an enlarged scale of the valve member and seat shown in Fig. 1;

Fig. 3 is a view similar to Fig. 2, showing a modified form of seat;

Fig. 4 is a view similar to Fig. 1, showing the application of the invention to a different form of valve; and Fig. 5 is an enlarged vertical section of the valve member and seat shown in Fig. 4.

The invention has been illustrated as applied to ball valves and more particularly to relief valves. This is by way of illustration only and is not by way of limitation. The invention is also applicable to large valves, but its greatest importance is in installations employing small seat and valve parts.

The form of the device shown in Figs. 1 to 3 has a nipple 1 tapped into the wall 2 of the container of the fluid, such as a pipe or tank. In the end 1a of the nipple 1 inserted into the container there is a threaded plug 3 having a bore 4 communicating with the interior of the container. This plug 3, set up in nipple 1, bears on an annular member or seat part 5 which bears on an annular member or seat part 6 seated against a resilient gasket 7 seated on a shoulder 8 of the nipple 1. As clearly shown in Fig. 2, the member 5 has a peripheral flange 5a on which is received the abutting face 6a of the member 6. The body 5b of the member 5 projects into the bore of member 6 and has a peripheral flange 5c with which co-acts an inner peripheral flange 6b of the member 6 to form a channel 9 in which is disposed a resilient sealing ring 10, which may be fabricated of suitable resilient seal material as, for instance, rubber, synthetic rubber or the like. A spherical valve member 11 is seated on the concave surfaces 5d and 6c of the members 5 and 6, respectively. Surfaces 5d and 6c are so relatively spaced that ring 10 contacts valve member 11 therebetween through the continuous opening intermediate seat surfaces 5d and 6c. A bore 12 through member 5 communicates with bore 4 of plug 3. A plurality of passages or conduits 13 through member 5 connect the bore 12 with the channel 9.

It has been found necessary where high pressures are to be controlled for the conduit means 13 to communicate with bore 12 at a point or points where the pressure which results in these conduits and channel 9, when valve member 11 is unseated, will be less than the pressure therein when the valve member is seated, to prevent seal ring 10 from being extruded from between parts 5 and 6. This may be accomplished by having the conduits communicate with bore 12 along a somewhat constricted cylindrical wall passage as shown in Fig. 2. The Venturi effect is even greater in the modification of Fig. 3 where bore 12a is formed as a venturi. The opening between the surfaces 5d and 6c is smaller than the cross-sectional dimension of the channel 9 and of the member 10 and therefore the member 10 will not be extruded through the opening except in the event of relatively great pressure differentials thereacross. Of course, the reduction of pressure in back of member 10 plus the build-up of downstream pressure almost instantaneously lowers the pressure differential across member 10 when the ball leaves its seat.

Valve member 11 projects into a bore 14 in nipple 1, of slightly greater diameter than the diameter of member 11. In a slightly enlarged portion 14a of the bore 14, there is slidably disposed a plunger member 15 for holding valve member 11 closed against normal pressure within the container 2. The closed or open position of the valve member 11 effects a control of the escape of pressure fluid from container 2 through a discharge port 16 in nipple 1, which port connects bore 14 to atmosphere. Member 15 has on one end a pin 15a impinging member 11 and on its other end a pin 15b passed through an apertured disc 17 seated in a socket 18 on the end of nipple 1. Threaded into and projecting from the socket 18 there is a cylindrical casing 19 containing a coil spring 20 confined between cups 21 and 22. The cup 21 bears on the pin 15b of the plunger member 15 and the cup 22 is pressed by a hollow screw 23 threaded into head 19a of the casing 19. A lock nut 24 is provided on the screw 23 exterior of head 19a for maintaining adjustment of screw 23 after the screw has been adjusted by means of a non-circular head 25 thereon to determine the loading of spring 20. The screw 23 has a bore 23a axially thereof in the upper end of which there is threaded a rod 26 with a threaded head 27 for receiving a hand wheel or the like. Rod 26 passes through bore 23a of bolt 23 and a bore 22a of cup 22 and into a socket 21a of cup 21, and serves as a means of locking valve member 11 in closed position when desired. Suitable detent means for plunger member 15 consists of a pin 28 fixed in a rotatable shaft 29 so as to be rotatable therewith in the nipple 1. Pin 28 is engaged by tapered surface 15c when the element 15 moves toward open position and rotates shaft 29 moving its nose 29a in beneath the shoulder 15d to retain the element in open position and prevent the spring 20 from acting upon the valve member to close it. Manipulation of shaft 29 will disengage the detent from the plunger element 15 and permit the spring 20 to move valve member 11 to closed position whenever desired.

In the form of the device shown in Fig. 3, the bore 12a through the member 5 has a constriction 12b in which is a peripheral cylindrical surface 12c through which the conduits 13 communicate with bore 12a for the reason hereinbefore mentioned, of providing a Venturi effect to reduce the pressure within conduits 13 and channel 9 when the valve member 11 is unseated.

The device shown in Figs. 4 and 5 has a nipple 101 tapped into the wall 102 of the container of fluid. In the end 101a of the nipple 101 inserted into the container, there is threaded a plug 103 providing an annular peripheral channel 104 between the plug and nipple, the channel communicating with the interior of the container. This plug 103, set up in nipple 101, bears on an annular member 105 which bears on an annular member 106 seated against a resilient gasket 107 in turn seated on a shoulder 108 of the nipple 101. As clearly shown in Fig. 5, the member 105 has a peripheral flange 105a on which is received the abutting face 106a of the member 106. The body 106b of the member 106 projects into the member 105 and has a peripheral flange 106c with which co-acts an inner peripheral flange 105b of the member 105 to form a channel 109 in which is disposed a resilient sealing ring 110. A spherical valve member 111 is seated on the concave surfaces 105c and 106d of the members 105 and 106, respectively. The surfaces 105c and 106d are so relatively spaced that the ring 110 contacts valve member 111 therebetween. The member 111 is received in a cavity 103a in the plug 103 and seated on the surfaces 105c and 106d by a coil spring 112 interposed between the member 111 and the end of the cavity 103a. A plurality of passages 113 connect the channel 104 with the cavity 103a.

The member 105 is provided with a plurality of radial conduits or passages 105d connecting the channel 109 with the cavity 103a which is of slightly greater diameter than that of the spherical valve member 111 therein. The valve member 111 projects slightly into bore 106e in member 106, into which extends a pin 114 supported by a reduced diameter neck portion 114a. Pin 114 bears on the valve member 111 and extends through a conical bore 115 in the nipple 101. The pin is supported by and extends from a head 116 slidable snugly in a cavity 117 in the nipple 101 and extending into a socket 118 on the end of the nipple 101. The head 116 has ports 116a connecting the cavity 117 and the socket 118. A discharge port 101b in the nipple 101 connects the cavity 117 with atmosphere.

Threaded into and extending from the socket 118 there is a cylindrical casing 119 containing a coil spring 120 confined between cups 121 and 122. The cup 121 bears on the head 116 and the cup 122 is pressed by a bolt 123 threaded into head 119a of the casing 119. A locknut 124 is provided on the bolt 123 exteriorly of head 119a for maintaining adjustment of bolt 123 after the bolt has been adjusted by means of a hex-head 125 thereon.

There will now be described the use and operation of the two embodiments of the invention hereinbefore described. The form shown in Figs. 1, 2 and 3 is so designed that the valve member 11 unseats to permit discharge through port 16 when the pressure of the fluid in the container increases to a certain degree, and the form shown in Figs. 4 and 5 is so designed that the valve member 111 opens the discharge port 101b when the pressure of the fluid in the container decreases to a certain degree.

It is obvious from Fig. 1 that the valve member 11 is subjected to the pressure of the fluid in the container, through the bores 4 and 12, tending to move the member 11 from its seat against which it is urged by member 15 under the adjusted pressure of the spring 20. Should this pressure of the fluid, to which the member 11 is subjected, increase to a degree superior to the adjusted pressure of the spring 20, the member 11 would be moved off its seat and open the port 16, the fluid under pressure escaping from the container through the bores 4, 12 and 14, and port 16 to atmosphere. The member 11 can be reseated by manipulation of the shaft 29 into the position shown in Fig. 1 to release the piston member 15, whereupon the action of spring 20 will force valve 11 against its seat. Valve member 11 may be held seated by screwing down the rod 27.

It will be noted (Fig. 2) that the fluid under pressure is supplied from bore 12 through conduits 13 to subject the sealing ring 10 in the channel 9 to its pressure, thereby effectively sealing the joint between the spherical valve member 11 and its seat. It is to be particularly noted that, should the degree of pressure suffice to move the member 11 from its seat, the consequent flow of the fluid through the bore 12 would tend to exhaust fluid from conduits 13, reducing the pressure therein, so that the ring 10 is relieved of excess pressure differential thereacross when the valve member 11 is unseated, which otherwise would extrude the resilient seal member 10 through the annular channel formed between the seat surfaces 5d and 6c. This reduction of pressure within conduits 13 in the Fig. 3 modification is even more marked due to the further constriction of bore 12a by the portion 12c. This structure is preferred when higher pressures are to be encountered.

Turning to the embodiment of Figs. 4 and 5, it is obvious from Fig. 4 that the valve member 111 is subjected to the pressure of the fluid in the container, through channel 104, passages 113 and cavity 103a, tending to press member 111 against its seat from which it is urged by pin 114 and head 116 pressed by the adjusted pressure of the spring 120. Should this pressure of the fluid, to which the member 111 is subjected, decrease to a degree that the closing force on member 111 becomes inferior to the adjusted pressure of the spring 120, the member 111 would be moved off its seat and thereby open port 101b, the fluid escaping from cavity 103a through bores 106e and 115, cavity 117 and port 101b to atmosphere. It will be noted that ports 116a serve to pass the fluid under pressure from the cavity 117 to the socket 118 thus equalizing pressure on the sides of the head 116. It will be further noted (Fig. 5) that the fluid under pressure is supplied from cavity 103a through conduits 105d to subject the sealing ring 110 in the channel 109 to its pressure, thereby effectively sealing the joint between the spherical valve member 111 and its seat. It is to be particularly noted that, should the degree of pressure of the fluid be insufficient to seat valve member 111, there would be no excess pressure differential across the seal member 110 which would tend to extrude it through the annular channel provided in the seat.

The arrangement of the seat assembly including seat parts 5 and 6 of the Figs. 1 to 3 modification and seat parts 105 and 106 of the Figs. 4 and 5 modification is such that two cooperating parts provide the channel for the resilient seal member and that part 5 in Figs. 1 to 3, and parts 105 and 106, as well as nipple 101, in Figs. 4 and 5, provide passages communicating with the high pressure side of the flow conduit controlled by the valve. The pressure controlled is thus utilized to force the resilient seal member into sealing engagement with the valve member and seat parts. However, when the valve unseats the pressure differential across the seal member reduces at once so the seal ring is not extruded from between the seat parts.

The construction of the seat parts is such that they may be economically fabricated and easily assembled into proper place within the conduit to be controlled. No threaded engagement between the parts is required and on assembly they are held firmly in abutment one with the other by a single locking member threaded to the valve body and having an opening therethrough to provide a part of the passageway.

From the foregoing it will be seen that this invention is one well adapted to attain all of the ends and objects hereinabove set forth together with other advantages which are obvious and which are inherent to the structure.

It will be understood that certain features and sub-combinations are of utility and may be employed without reference to other features and sub-combinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having described our invention, we claim:

1. A seat arrangement comprising a body with a flow passage therethrough, a valve seat in the body surrounding the passage and adapted to receive a valve member seating thereagainst, a constriction in the passage upstream of the seat, an annular channel intermediate the edges of the seat surface of said seat and having an opening at the seat surface of lesser width than that of the channel portion internally adjacent the opening, flowable packing material within and contacting opposing sides of the channel and conduit means for supplying fluid from upstream of the seat to the channel to urge the packing material against a seated valve member, said conduit means communicating between the channel and the constriction in the passage.

2. The assembly of claim 1 wherein the construction of the passage is of Venturi type construction.

3. A valve for controlling flow of fluid comprising a valve body providing a fluid passageway, a seat assembly in said body having an annular seat surface surrounding said passageway, the assembly having an annular channel therein with its open side interrupting said seat surface intermediate the inner and outer edges thereof, said channel having opposing walls converging at the open side of the channel, a valve member movable to seat upon the seat surface of the assembly and cover the open side of said channel, a resilient continuous seal member within the channel, said seal member having a greater cross-sectional dimension than the distance between said opposing walls so that pressure within the channel can urge the seal member toward the open side of the channel, and a passage establishing communication between the channel on the side of the seal member remote from the open side of the channel and the fluid passageway on the upstream side of the seat assembly, said passage communicating with the fluid passageway at a point of reduced cross-sectional flow area thereof so that when the valve member is unseated in operation, the rush of fluid through the fluid passageway effects a reduction in the pressure in said channel on said remote side of the seal member below the pressure existent therein with the valve member seated.

4. A valve for controlling flow of fluid under pressure which comprises, in combination, a valve body assembly having a fluid passageway therethrough and an annular channel surrounding said passageway with its open side communicating with said passageway, a flexible seal member mounted in said channel and in contact with opposing walls thereof, a valve member movable to seat across said open side of the channel and bear against said seal member, a constriction in the passageway upstream of the channel, the body assembly having a passage communicating between said channel on the side of said seal member remote from the open side of the channel and said constriction upstream of the channel, the open side of said channel being disposed so that the surface of the seal member which bears against said valve member diverges outwardly of the longitudinal axis of said passageway whereby movement of the valve member in an unseating direction disengages it from said seal member without any substantial rubbing friction therebetween.

5. In a valve for controlling the flow of a fluid under pressure, the combination of a valve body forming a conduit for said fluid; an annular valve seat in said body defining a portion of said conduit and having therein an annular channel with opposing walls; a flexible sealing ring mounted in said channel and of a cross section not less than the distance between said opposing walls; and a valve member co-acting with said seat and, when seated, bearing on said sealing ring; said seat being provided with passages connecting said conduit on the upstream side of the seat with said seat channel on the side of said sealing ring remote from the open side of said channel so that when the valve member is seated, pressure upstream of said seat will urge said sealing ring toward the open side of said channel; a constriction in said conduit upstream of the seat; said passages being in communication with said conduit at said constriction so that the pressure on said remote side of the sealing ring is reduced when flow is first established through the conduit upon unseating of the valve member.

6. In a valve for controlling flow of fluid through a passageway in a conduit, a seat assembly including two cooperating parts formed with a seating surface surrounding said conduit passageway, one of said parts having a flow passage therethrough providing a part of said conduit passageway, said flow passage in said one of said parts being located upstream of the seating surface and being constricted relative to other portions of said conduit passageway to provide a reduced pressure at the region of the constriction relative to that of other portions of said conduit passageway when flow is established therethrough, said parts being formed to provide, upon assembly, an internal channel having a continuous opening, the width of the opening being less than the cross-sectional dimension of the channel inwardly adjacent the opening, said opening residing intermediate the inner and outer edges of the seating surface, pressurizing passages formed in one of the parts communicating between the channel and the flow passage through said one of said parts at the constriction, a resilient seal member within the channel intermediate the opening and the pressurizing passages and having a cross-sectional dimension at least as great as said cross-sectional dimension of said channel, and a valve member adapted to seat against the seating surface and be engaged by the seal member, the seal member being forced against said valve member when the latter is seated by the pressure differential across the seal member to seal across the opening and also the joint between the seating surface and valve member.

7. The assembly of claim 6 wherein the said flow passage in said one of said parts and the constriction are of Venturi construction.

References Cited in the file of this patent

UNITED STATES PATENTS

| Number | Name | Date |
| --- | --- | --- |
| 1,380,415 | Putnam | June 7, 1921 |
| 1,721,114 | Hampton | July 16, 1929 |
| 1,971,713 | Greve | Aug. 28, 1934 |
| 1,983,797 | Greve | Dec. 11, 1934 |
| 2,114,934 | Nordstrom | Apr. 19, 1938 |
| 2,263,750 | Willke | Nov. 25, 1941 |
| 2,415,258 | Parker | Feb. 4, 1947 |
| 2,481,482 | Green | Sept. 13, 1949 |
| 2,506,111 | Saint | May 2, 1950 |
| 2,538,133 | Tratzik | Jan. 16, 1951 |
| 2,542,390 | Brown | Feb. 20, 1951 |
| 2,616,653 | Tarr | Nov. 4, 1952 |

FOREIGN PATENTS

| Number | Country | Date |
| --- | --- | --- |
| 431,474 | Germany | of 1926 |